United States Patent
Sato et al.

(10) Patent No.: US 6,312,320 B2
(45) Date of Patent: *Nov. 6, 2001

(54) DISK CLEANER

(75) Inventors: Yasuharu Sato; Fumihiko Aiyama; Minoru Yonekawa; Tadashige Kondo, all of Tokyo (JP)

(73) Assignee: Kioritz Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/332,716

(22) Filed: Jun. 14, 1999

(30) Foreign Application Priority Data

Jun. 16, 1998 (JP) .................................................. 10-168047

(51) Int. Cl.⁷ ........................................................ B24B 5/00
(52) U.S. Cl. ............................ 451/285; 451/290; 451/287
(58) Field of Search ..................................... 451/285, 287, 451/288, 289, 41, 42, 259, 283, 268, 269, 60, 290, 456; 15/77, 88.2, 102, 97.1

(56) References Cited

U.S. PATENT DOCUMENTS

| | | |
|---|---|---|
| 4,047,913 * | 9/1977 | Okumura ............................. 451/456 |
| 4,179,852 | 12/1979 | Barnett . |
| 4,561,142 * | 12/1985 | Mischenko et al. .................. 15/97 R |
| 4,783,870 * | 11/1988 | Yeung .................................. 15/97 R |
| 4,825,497 * | 5/1989 | Nagao et al. ......................... 15/97 R |
| 4,947,505 * | 8/1990 | Hood ...................................... 15/246 |
| 5,102,099 * | 4/1992 | Brown et al. ......................... 451/283 |
| 5,593,343 | 1/1997 | Bauer . |
| 5,651,160 | 7/1997 | Yonemizu et al. . |
| 5,872,633 | 2/1999 | Holzapfel et al. . |
| 5,938,510 * | 8/1999 | Takahashi et al. .................... 451/290 |
| 6,012,970 | 1/2000 | Nagabushnam et al. . |

FOREIGN PATENT DOCUMENTS

| | | |
|---|---|---|
| 2 334 470 | 8/1999 | (GB) . |
| 62-222479 | 9/1987 | (JP) . |
| 7098960 | 4/1995 | (JP) . |

* cited by examiner

*Primary Examiner*—Joseph J. Hail, III
*Assistant Examiner*—George Nguyen
(74) *Attorney, Agent, or Firm*—Baker Botts L.L.P.

(57) ABSTRACT

A disk cleaner includes a polishing member which is adapted to be rotated while being engaged with a surface of the disk, thereby to polish the surface of the disk. The polishing member is disposed such that the rotational axis of the polishing member is kept perpendicular to the surface of the disk, thereby to cause the disk to rotate in one direction due to a frictional force between the polishing member and the surface of the disk. The rotational axis of the polishing member is spaced apart from a rotational axis of the disk in the radial direction of the disk, whereby only part of the polishing member engages the surface of the disk.

18 Claims, 7 Drawing Sheets

DISK CLEANER

BACKGROUND OF THE INVENTION

The present invention relates to a disk cleaner for removing flaws on a disk or dirt adhered to the surface of a disk, such as an optical disk or a photomagnetic disk of the type employed as an information recording medium, and in particular to a disk cleaner which polishes a soiled surface of the disk by pressing a rotating polishing member, such as a buffing wheel, against the soiled surface of the disk.

In recent years, various kinds of disks, such as a laser disk, a CD (compact disk), CD-ROM, DVD, etc., are extensively employed as an information recording medium for use in audio and video recording or in a computer. When a flaw is present or dirt is adhered to the surface, in particular, of the recording surface of these disks, not only is the external appearance of the disk diminished, but also the recorded data of the flawed portion or soiled portion may not be properly read out, thereby making it difficult or impossible to properly reproduce the recorded data.

Under the circumstances, such a flaw or dirt that has been adhered to the surface of the disk has been conventionally removed manually using a cloth. However, such a manual operation is troublesome and takes time, and additionally, it is difficult, by such a manual operation, to sufficiently remove the flaws or the dirt. In particular, in a shop that handles secondhand CDs or a library where a large number of disks are retained and frequently replaced or loaned out, the removal of flaws or dirt adhered to the surface of the disk involves a lot of labor. Therefore, there has been a long felt need for a device to mechanically and automatically remove flaws on or dirt adhered to the surface of the disk in place of the conventional manual removal of such flaws or dirt.

In response to such a demand, a disk cleaner has been proposed in Japanese Patent Unexamined Publication H7-122038, wherein a peripheral surface of a cylindrical polishing member, such as a buffing wheel, is pressed against the surface (recording surface) of a disk while the disk is caused to rotate, thereby polishing the recording surface.

However, the disk cleaner proposed in the aforementioned Japanese Patent Unexamined Publication is subject to the following problems.

(1) Since the peripheral surface of the polishing member is engaged with the surface to be polished of the disk (hereinafter simply referred to as "the surface of the disk"), or in other words, since the rotational axis of the polishing member is disposed parallel with the surface of the disk at the time of polishing, the distal end portion of the polishing member is always engaged with a radially inner portion of the disk while the proximal portion of the polishing member is always engaged with a radially outer portion of the disk. More specifically, all portions of the disk in the radial direction are always engaged with the same portions of the peripheral surface of the polishing member. In this case, since the circumferential speeds of rotation of portions of the disk farther from the center of the disk are higher than those of the portions of the disk closer to the center, a waviness is more likely to be generated all over the surface of the disk unless the cylindricity of the polishing member as well as the parallelism between the axis of rotation of the polishing member and the surface to be polished are properly maintained.

(2) Although it is generally preferable at the time of polishing of the disk to use two kinds of polishing member, i.e. a polishing member for rough-polishing (flaw removal) and a polishing member for fine-polishing (finishing), the disk cleaner proposed in the aforementioned Japanese Patent Unexamined Publication is arranged such that only one polishing member can be engaged with the surface of the disk, thus necessitating a frequent exchange of two kinds of polishing members, i.e., a polishing member for flaw removal and a polishing member for fine-polishing, which is troublesome for a worker using the disk cleaner.

(3) It is impossible, in the case of the disk cleaner proposed in the aforementioned Japanese Patent Unexamined Publication, to adjust the amount of pressure of the polishing member against the surface of the disk. Since the polishing member is gradually abraded and deformed due to the use thereof in operation, the pressure of the polishing member against the surface of the disk becomes insufficient unless the pressing force of the polishing member against the surface of the disk is properly adjusted, thus making it impossible to properly perform the removal of flaws and dirt from the surface of the disk.

(4) According to the disk cleaner proposed in the aforementioned Japanese Patent Unexamined Publication, it is required, when mounting or dismounting the disk or of exchanging one polishing member for another, to shift the disk-retaining arm, together with the disk-driving motor, in the radial direction of the disk (horizontal direction), thus involving a troublesome operation.

(5) Although it is required that the cylindricity of the polishing member as well as the parallelism between the polishing member and the surface to be polished be properly maintained, the disk cleaner proposed in the aforementioned Japanese Patent Unexamined Publication fails to take any suitable measures to meet these requirements. As a result, the pressure of the polishing member against the surface of the diskmay become non-uniform, thus making it impossible to uniformly polish the surface of the disk.

SUMMARY OF THE INVENTION

An object of the present invention is to overcome the aforementioned problems and, in particular, to provide a disk cleaner which is free from the problem of generating a waviness on the surface of the disk, capable of suitably removing any flaws on the disk surface or dirt that has been adhered to the disk surface, capable of easily changing the polishing members, and easy to operate.

With a view to attaining the aforementioned object, the disk cleaner according to the present invention is arranged, as a matter of the basic construction, such that it is provided with a polishing member in the form of, for example, a buffing wheel, which is adapted to be rotated while being engaged with a surface of a disk to be polished, thereby to polish the surface of the disk. The present invention is characterized in that the polishing member is oriented such that the axis about which it rotates is perpendicular to the surface of the disk, thereby to cause the disk to rotate in one direction due to a frictional force between the polishing member and the surface of the disk.

With a disk cleaner according to the present invention, which is constructed as described above, since the polishing member is disposed in such a manner that the rotational axis thereof is kept perpendicular to the surface of the disk when the disk is being polished, the entire surface of the polishing member will uniformly contact the surface of the disk. As a result, any non-uniform abrasion of the polishing member can be effectively prevented, so that the flatness of the polishing surface of the polishing member can be maintained, thus making it possible to prevent the generation of waviness on the surface of the disk.

Further, since the disk is caused to rotate in one direction due to a frictional force between the polishing member and the surface of the disk, it is possible to obtain a more beautiful finish as compared with the case where the disk (or a turntable on which the disk is mounted) is forcibly rotated by means of a motor. Additionally, since an excessive force is not imposed on the disk, the disk can be prevented from being damaged by the polishing member.

Additionally, since a motor is not required for rotating the disk, it is possible not only to prevent any temperature increase of the disk due to the heat generated by the motor but also to make the polishing apparatus more compact and to reduce the cost of the polishing apparatus.

According to a preferred embodiment of the present invention, a predetermined load is applied to the disk in a direction to suppress the rotation of the disk which is caused by a frictional force between the polishing member and the surface of the disk. According to a more preferred embodiment of the present invention, a fan for removing by suction shavings of the disk or abrasive powder is arranged to be driven by being coupled to a turntable for mounting the disk, thereby to impose the aforementioned load on the disk.

It is possible, according to the aforementioned preferred embodiments, to easily bring about a predetermined frictional force between the polishing member and the surface of the disk, thereby making it possible to more effectively polish the surface of the disk.

According to a preferred embodiment of the disk cleaner of the present invention, the polishing member is made movable in a direction perpendicular to the surface of the disk, thereby making it possible to adjust the pressing force of the polishing member against the surface of the disk.

It is possible, according to a preferred embodiment, to maintain a predetermined pressing force of the polishing member, even if the polishing member is gradually abraded and deformed due to the use thereof for a polishing operation.

According to another preferred embodiment of the disk cleaner of the present invention, the polishing member has an annular distal end surface that is adapted to engage the surface of the disk.

It is possible, according to a preferred embodiment, to easily cause the pressing force of the working face of each portion of the polishing member against the surface of the disk to be uniform, thereby making it possible to polish the surface of the disk more uniformly. Further, since the polishing member is tubular in configuration, it is possible to produce a force tending to rotate the disk in the direction which is opposite to a predetermined rotational direction of the disk effected by a frictional force between the disk and the polishing member.

According to a further preferred embodiment of the disk cleaner of the present invention, the polishing member is disposed such that the rotational axis thereof is spaced apart by a predetermined distance from the rotational axis of the disk in the radial direction of the disk, thereby causing only part of the polishing member to contact the surface of the disk. In a more preferred embodiment of the disk cleaner of the present invention, the rotational diameter of the polishing member is larger than the width in the radial direction of the surface region to be polished of the disk.

It is possible, according to these preferred embodiments, to polish the entire surface region to be polished of the disk without necessitating shifting the polishing member and/or the disk in the radial direction of the disk, thereby making it possible to simplify the structure and mechanism of the disk cleaner.

Further advantages are gained, according to the present invention, by providing two polishing members with different polishing characteristics, each of which is arranged to be selectively engaged with the surface of the disk and rotated while the other is spaced apart from the disk and idle.

DESCRIPTION OF THE DRAWINGS

For a more complete understanding of the present invention, and the advantages thereof, reference may be made to the following written description of an exemplary embodiment, taken in conjunction with the accompanying drawings.

DESCRIPTION OF THE EMBODIMENT

The present invention will be further explained with reference to the drawings depicting an embodiment of the present invention.

Figure 1:
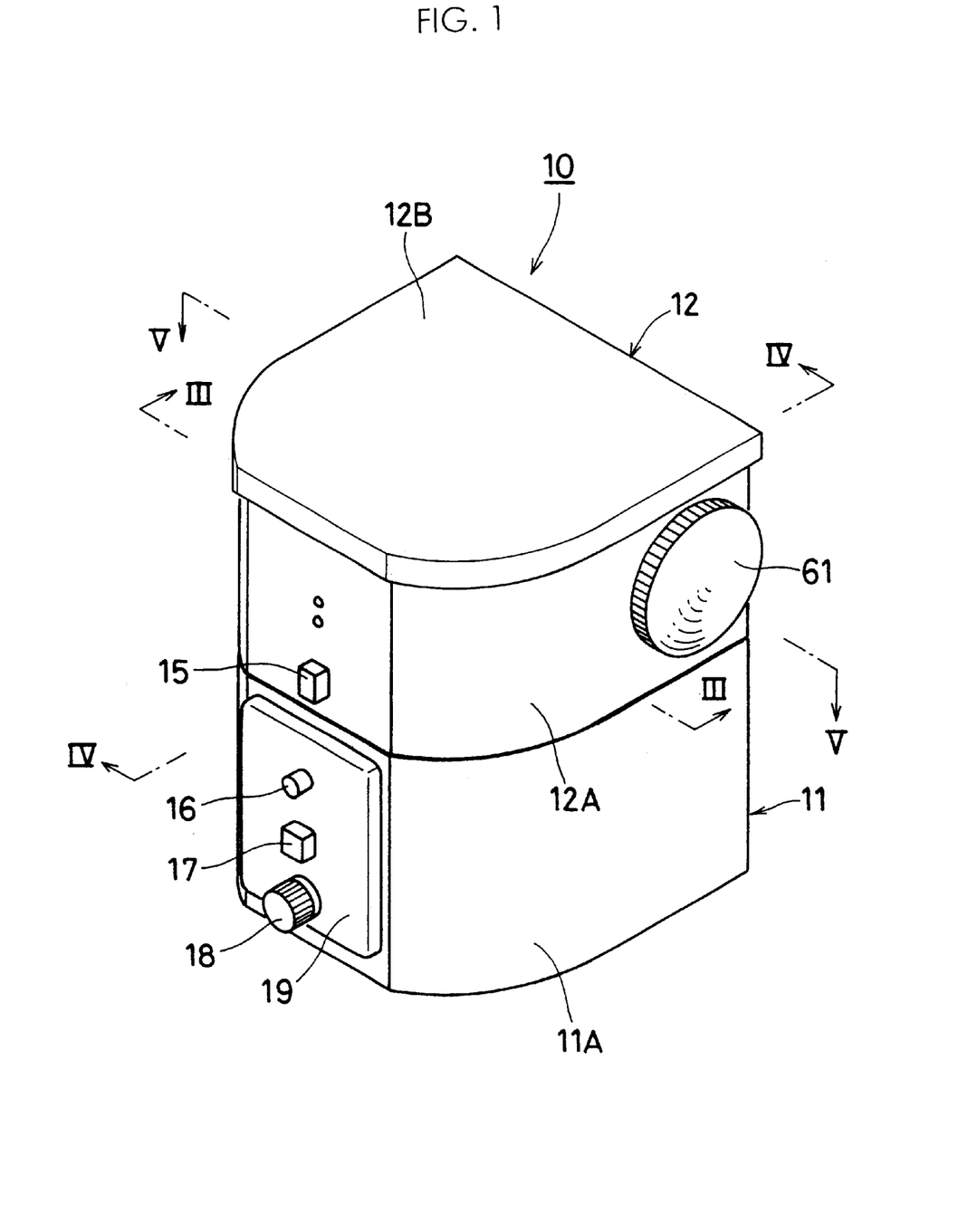
FIG. 1 is a perspective view illustrating the external appearance of a disk cleaner according to one embodiment of the present invention.
Figure 2:
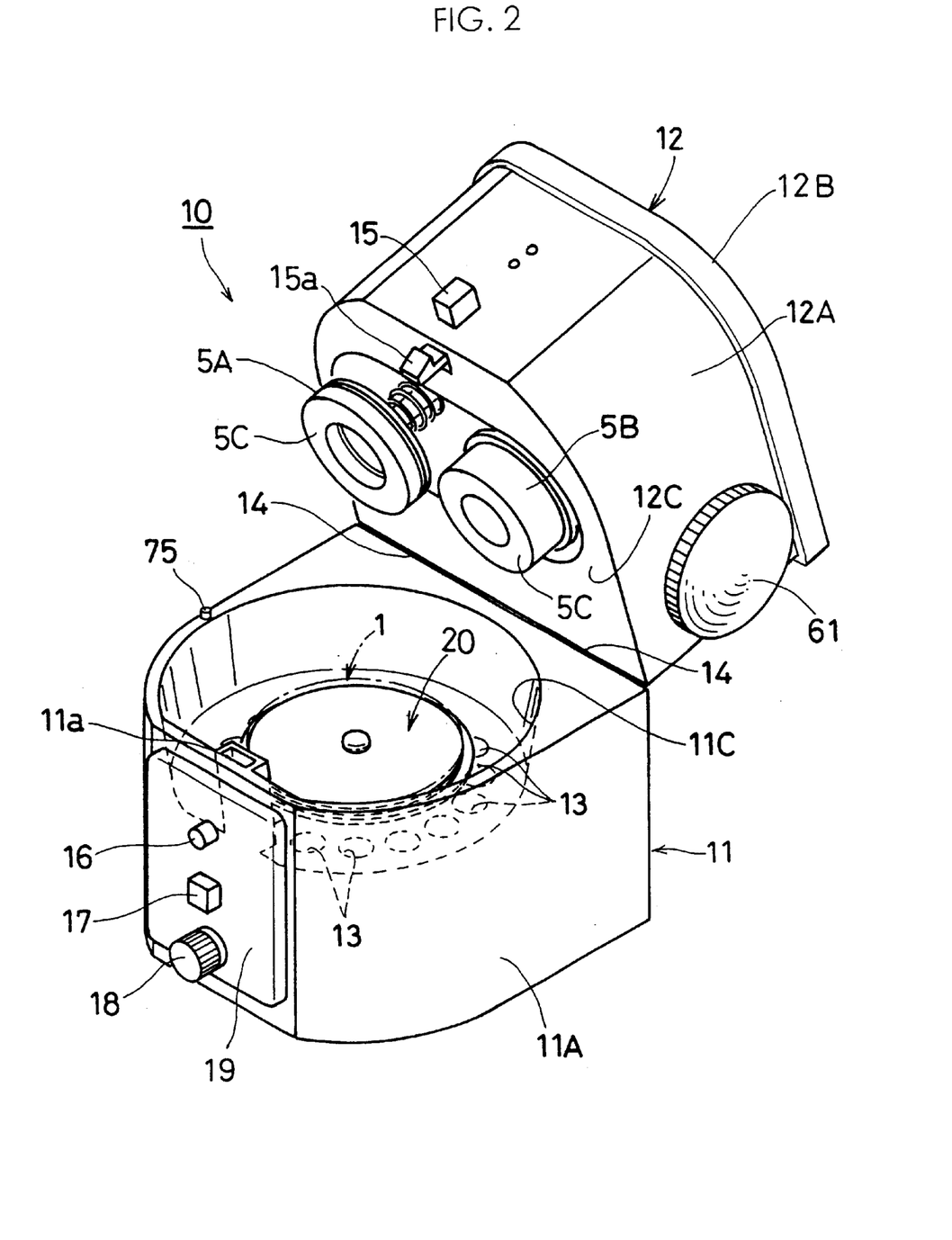
FIG. 2 is a perspective view of the disk cleaner of FIG. 1, wherein an upper housing of the disk cleaner is opened.

FIG. 1 shows the external appearance of a disk cleaner according to the exemplary embodiment of the present invention. The disk cleaner 10 shown in FIG. 1 is designed to clean and polish a disk of about five inches in diameter, such as a CD, and comprises a lower housing 11 and an upper housing 12. The upper housing 12 is pivotally attached to the lower housing 11 and arranged to be pivotally opened upwardly about hinges 14 (see FIGS. 2 and 4) that are provided on the back side of the upper housing 12 (FIG. 2 shows the upper housing 12 fully opened). As may be seen in FIGS. 3 to 5, the lower housing 11 comprises a generally semi-cylindrical side plate 11A, a bottom plate 11B, an upper retaining plate 11C having a bowl-like recessed portion, and an inner retaining plate 11D. The upper housing 12 comprises a generally semi-cylindrical side plate 12A, a top plate 12B, and a bottom plate 12C having a bowl-like recessed portion.

Figure 3:
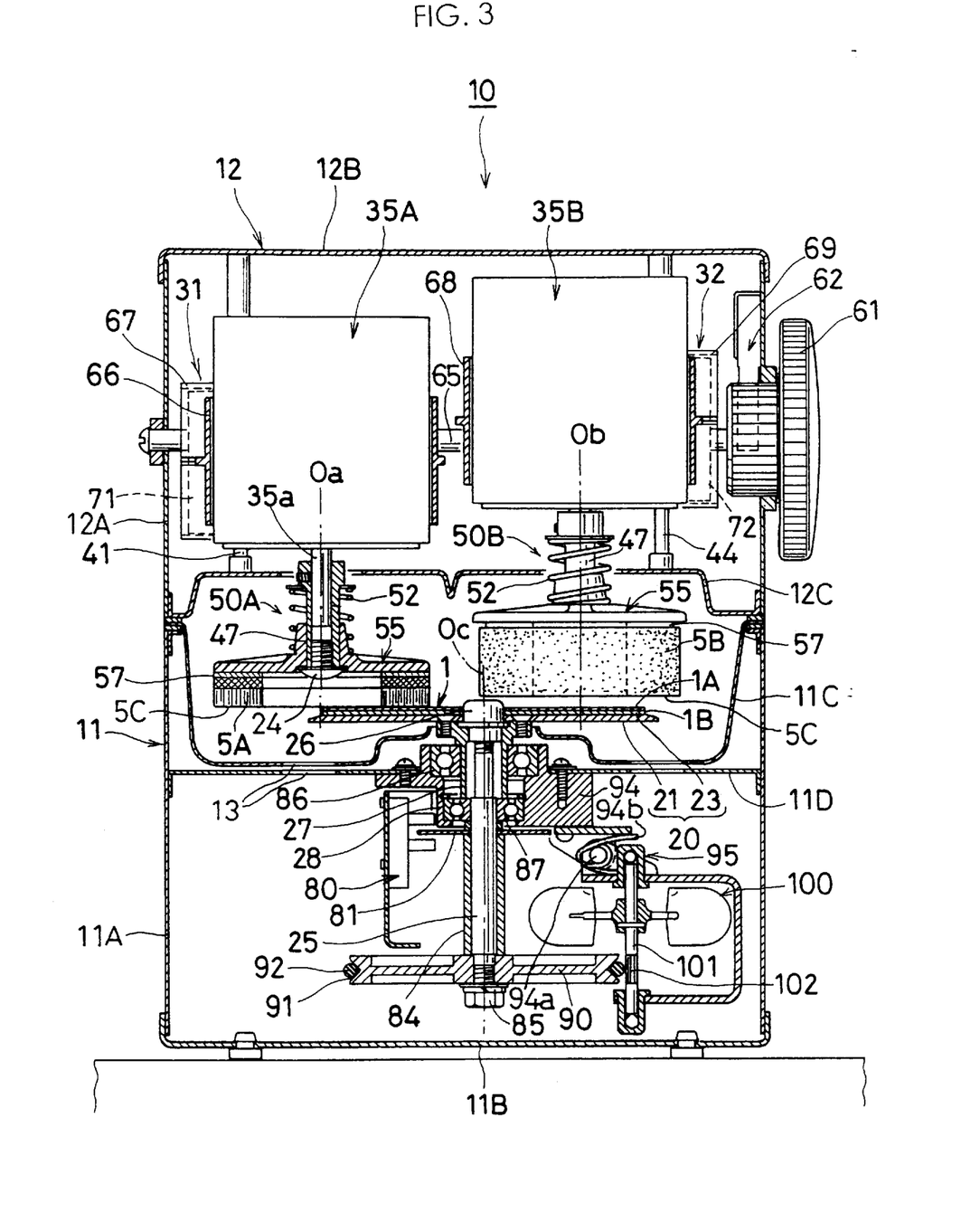
FIG. 3 is a cross-sectional view taken along the line III—III of FIG. 1.

In the lower housing 11, a rotatable shaft 25 is supported within a retaining sleeve 28 affixed to the inner retaining plate 11D, the axis of rotation of the rotatable shaft 25 being perpendicular to the retaining plate 11D. A spindle 26 is screwed onto the top portion of the rotatable shaft 25. The spindle 26 is located above the top plate 11C, and a turntable 20 consisting of a substrate 21 and a rubber plate 23 is attached by a table retaining member 27 to the spindle 26. A disk (e.g., a CD) 1 can be mounted on the turntable 20 with the recording surface (the surface to be polished) 1A of the disk 1 facing upwardly and the non-recording surface (labeled surface) 1B thereof facing downwardly. Further, ball bearings 86 and 87 which are capable of withstanding any thrust are placed between the table retaining member 27 and the rotatable shaft 25.

A rotation-detecting disk 81, which is provided with a predetermined number of slits (not shown) spaced apart equidistantly from each other for enabling detection of the revolution speed of the turntable 20, is attached to a portion of the rotatable shaft 25 which is located below the lower ball bearing 87. On one side of the rotation-detecting disk 81 is disposed a rotation detector 80, such as a hole IC, for detecting the revolution speed of the rotation-detecting disk 81.

A tubular spacer 84 and a fan-driving wheel 90 are externally received over a portion of the rotatable shaft 25 which is located below the rotation-detecting disk 81. The rotation-detecting disk 81, the tubular spacer 84 and the fan-driving wheel 90 are all fastened by means of a nut 85, which is screwed onto the lower end portion of the rotatable shaft 25, thereby causing those members to be rotated with the rotatable shaft 25.

An elastic ring 92 formed of an elastic material such as rubber is fitted under tension in the outer peripheral groove portion 91 of the fan-driving wheel 90. On one side of the fan-driving wheel 90 is arranged a fan 100 which is pivotally received on a pivot-supporting shaft 94a that is supported by a supporting member 95, which is secured by a mounting member 94 that is fixed to the inner retaining plate 11D.

The fan 100 is arranged, as described below, to remove by suction shavings of the disk D or abrasive powder and has a rotatable shaft 101, on which a serrated portion 102 formed by serrations or teeth is formed. The serrated portion 102 is arranged in such a manner that it is engaged by the pushing force of a biased spring 94b placed around the pivot-supporting shaft 94a with the elastic ring 92 of the fan-driving wheel 90, thereby allowing the elastic ring 92 to be suitably engaged to drive the serrated portion 102.

Therefore, when the turntable 20 is rotated, the resultant rotational driving force of the turntable 20 is transmitted via the rotatable shaft 25 and the fan-driving wheel 90 to the rotatable shaft 101, thereby causing the fan 100 to rotate.

In the upper housing 12, there are four fixed guide rods 41, 42, 43 and 44, which are perpendicular to and extend between the top plate 12B and the bottom plate 12C. The guide rods 41 and 42 positioned on the left side in FIG. 3, among these guide rods 41 to 44, are employed for slidably (in the vertical direction) supporting a left sliding elevator 31 that carries a geared motor 35A for rotating a polishing member 5A that is used for removing flaws (rough-polishing) on the disk 1. The guide rods 43 and 44 positioned on the right side in FIG. 3 are employed for slidably (in the vertical direction) supporting a right sliding elevator 32 that carries a geared motor 35B for rotating a polishing member 5B that is used for fine-polishing the disk 1.

The left sliding elevator 31 comprises, in addition to the motor 35A, a pair of sliding sleeves 37, which are slidably fitted on the guide rods 41 and 42, a left mounting plate 66 mounted to couple the sliding sleeves 37 with the motor 35A, a U-shaped left cam lift plate 67 which is attached to the left mounting plate 66, and a polishing member-retaining member 50A for retaining the polishing member 5A for removing flaws which is disposed below the motor 35A.

The right sliding elevator 32 comprises, in addition to the motor 35B, a pair of sliding sleeves 37 which are slidably fitted on the guide rods 43 and 44, a right mounting plate 68 mounted to couple these sliding sleeves 37 with the motor 35B, a U-shaped right cam lift plate 69 which is attached to the left mounting plate 68, and a polishing member-retaining member 50B for retaining the polishing member 5B for fine polishing which is disposed below the motor 35B.

Figure 6:
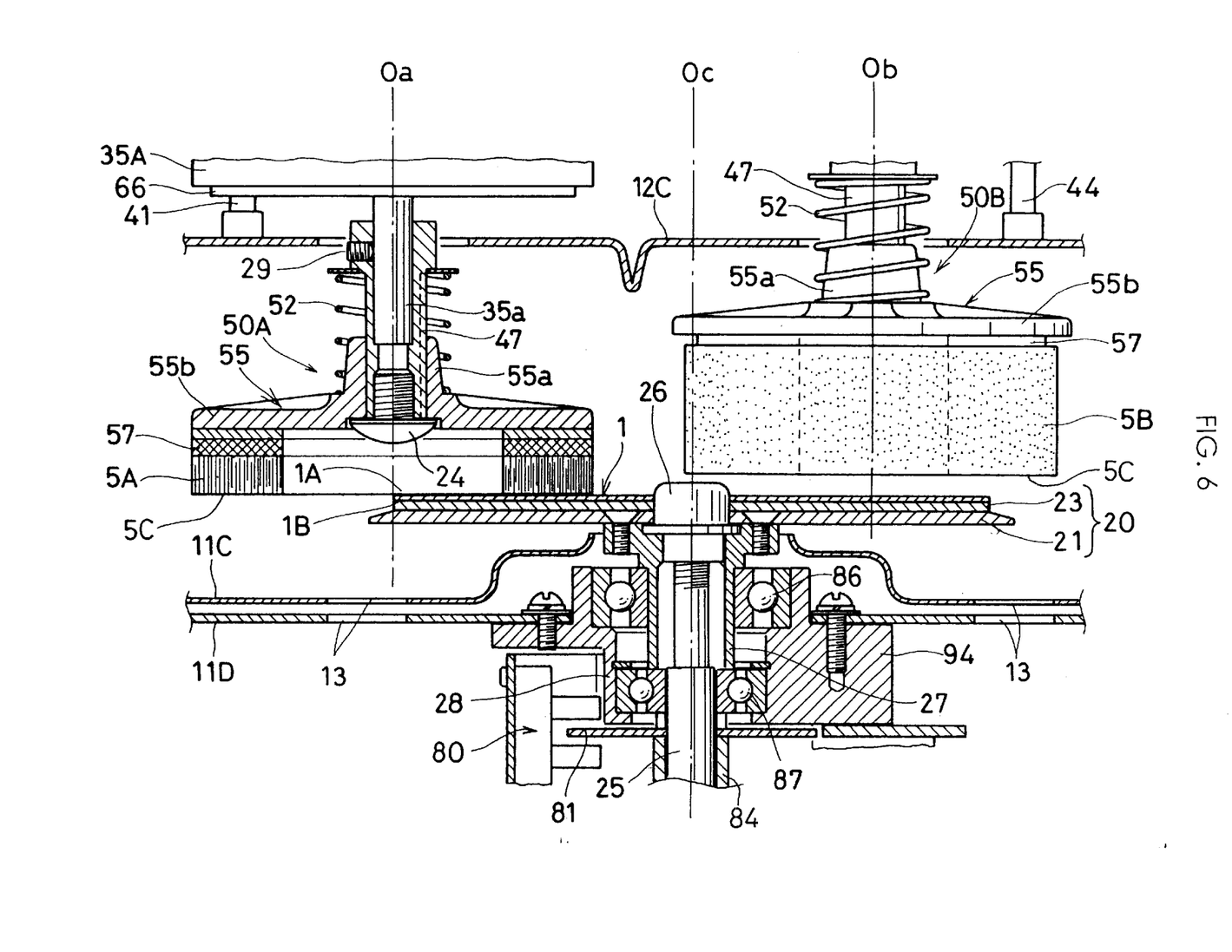
FIG. 6 is an enlarged sectional view illustrating the retainer portion of the polishing member shown in FIG. 3.

The polishing member-retaining members 50A and 50B, which are mounted on the left sliding elevator 31 and the right sliding elevator 32, respectively, are constructed in the same manner, and are provided, as clearly shown in FIG. 6, with a stepped connecting shaft 47 that is affixed by means of a fastening screw 29 to the output shaft 35a of the motor 35A or 35B, a sliding retainer 55 comprising a stepped body portion 55a slidably (in the vertical direction) fitted by way of spline-fitting on the stepped connecting shaft 47 and engaged with the mushroom-shaped head of the fastening screw 24 screwed in the lower portion of the stepped connecting shaft 47 and an annular portion 55b which is integrally attached to a lower portion of the stepped body portion 55a, and a coil spring 52 which is interposed under compression between the stepped portion of the body portion 55a and the stepped portion of the stepped connecting shaft 47 of the sliding retainer 55. The sliding retainer 55 is always urged to move downward by means of the coil spring 52.

The polishing member 5A having a tubular configuration (hollow cylindrical configuration) for removing flaws and the polishing member 5B having a tubular configuration for fine-polishing are detachably mounted through a mounting member 57 on the bottom side of the annular portion 55b of the sliding retainer 55 of each of the polishing member-retaining members 5A and 50B (arranged right and left) using, for example, Velcro (trade mark), thereby rendering the axial line of each of the polishing members 5A and 5B to become aligned with the rotational axis "Oa" or "Ob" of each of the polishing member-retaining members 50A and 5OB.

Figure 7:
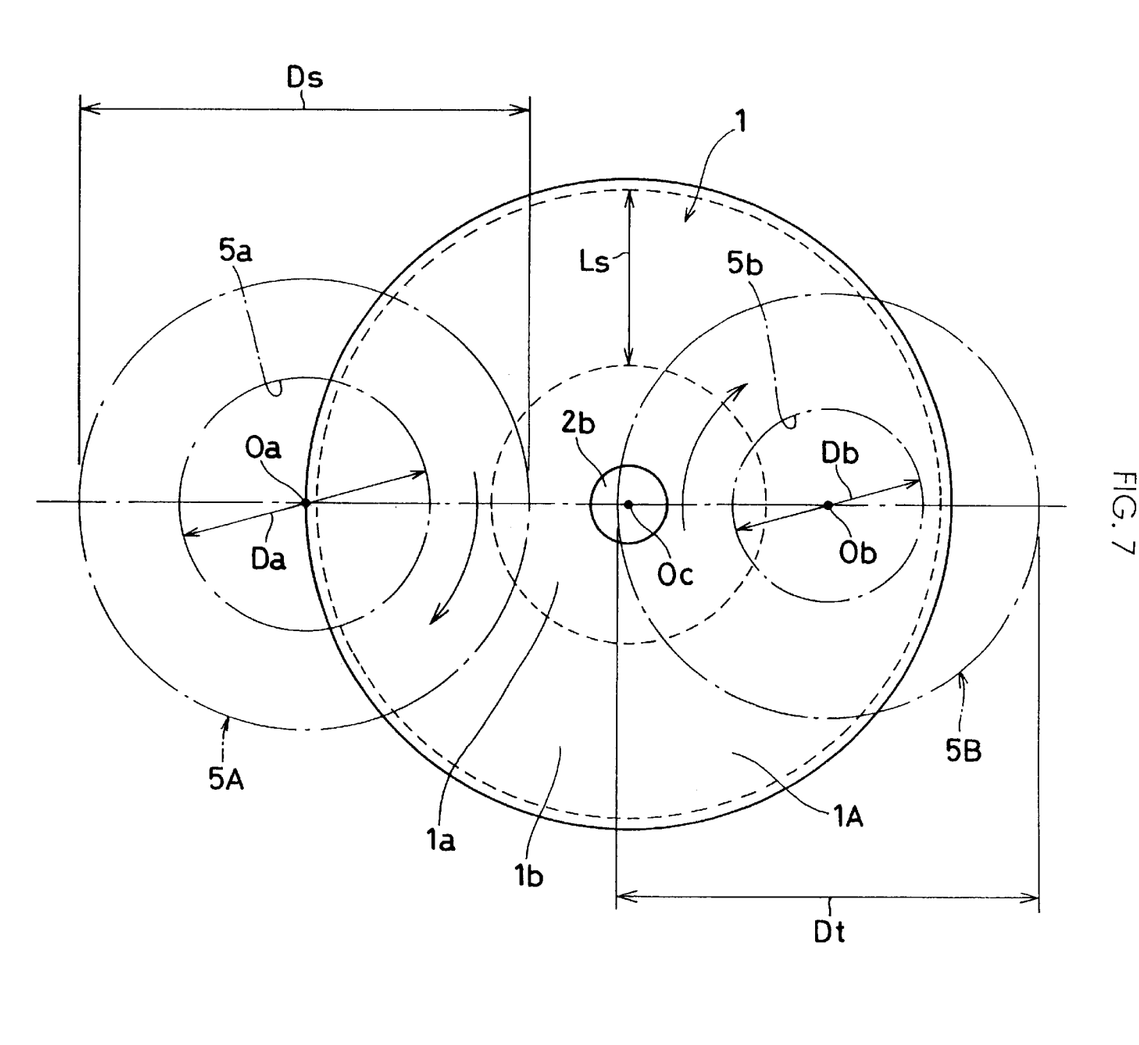
FIG. 7 is a plan view illustrating the relationship in arrangement between the polishing member of the disk cleaner shown in FIG. 1 and the disk.

The polishing members 5A and 5B are provided with a polishing material for removing flaws (rough polishing) and a polishing material for fine polishing, respectively, and the rotational axes "Oa" and "Ob" of the polishing members 5A and 5B are disposed perpendicular to the surface (to be polished) 1A of the disk 1 at the time of polishing, and at the same time, the bottom surfaces 5C of these polishing members 5A and 5B are engaged resiliently with the surface (to be polished) 1A of the disk 1. Further, as clearly seen from FIG. 7, the rotational axes "Oa" and "Ob" are located on a plane that also includes the rotational axis Oc of the turntable 20 on which the disk 1 is mounted or of the rotational axis Oc (the spindle 26), and at the same time, the rotational diameter Ds of the polishing member 5A as well as the rotational diameter Dt of the polishing member 5B are made larger than the width Ls in the radial direction of the recording region 1b to be polished of the surface (to be polished) 1A of the disk 1, thereby to ensure that the outer peripheral portion of each of these polishing members 5A and 5B partially falls outside of the non-recording region 1a located at the central portion of the disk 1 or outside of the disk 1.

According to the embodiment, the polishing member 5A for removing flaws and the polishing member 5B for fine-polishing are separately engageable with the surface 1A of the disk 1. In particular, the left sliding elevator 31 provided with the polishing member-retaining member 50A and the right sliding elevator 32 provided with the polishing member-retaining member 50B can be selectively moved into engagement with or retracted away from the surface 1A of the disk 1 by means of a cam-type elevating mechanism 60.

Figure 4:
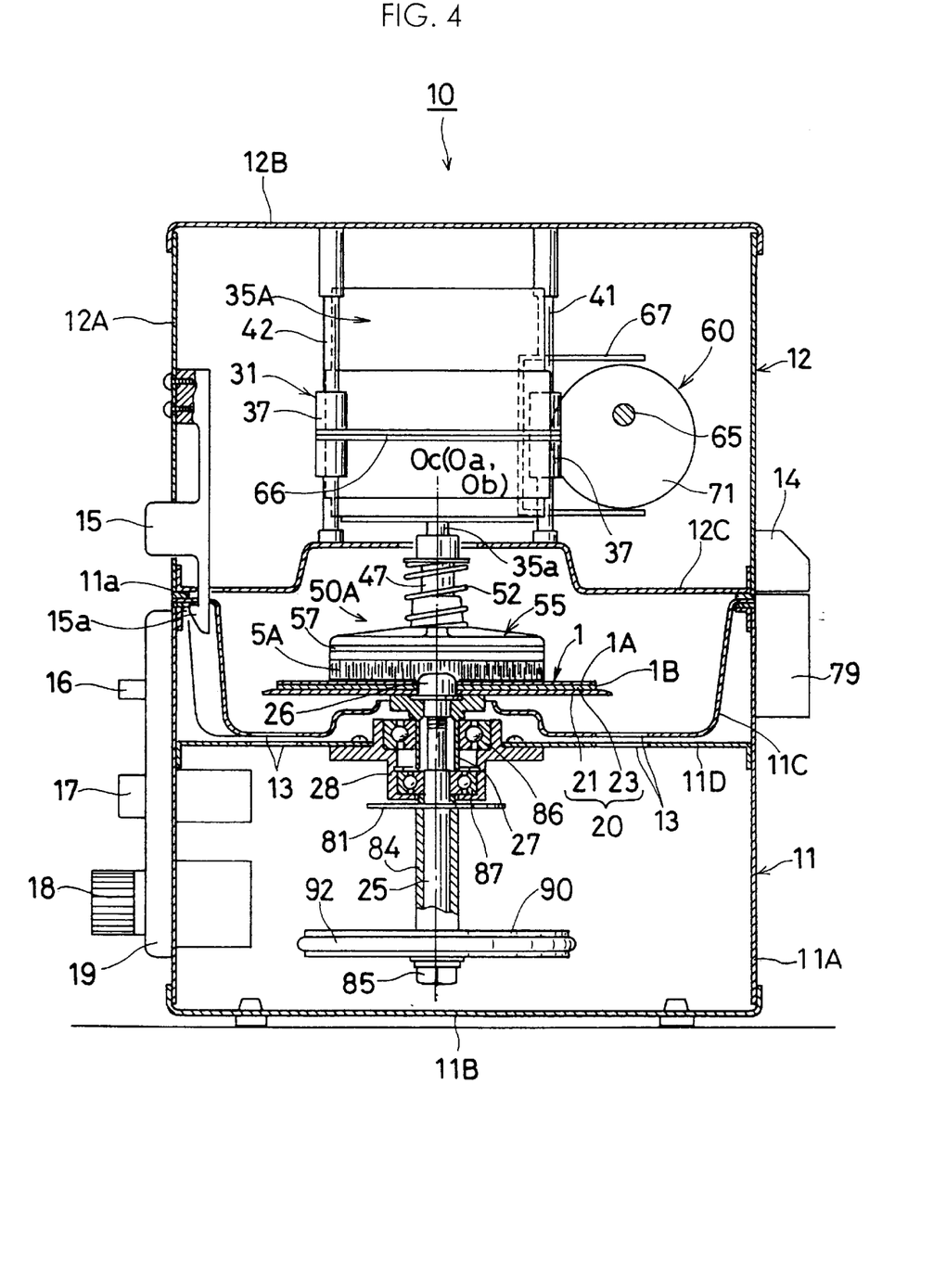
FIG. 4 is a cross-sectional view taken along the line IV—IV of FIG. 1.
Figure 5:
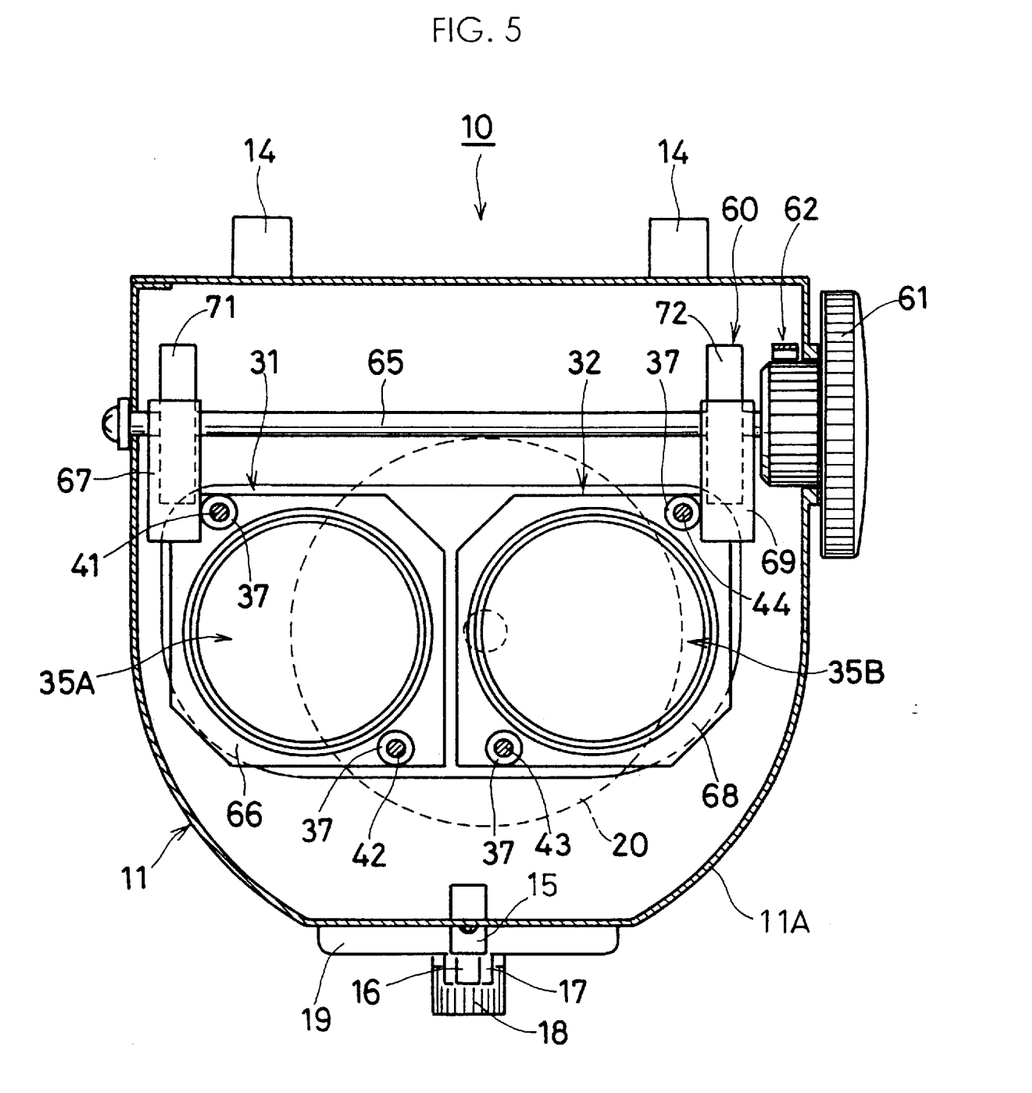
FIG. 5 is a cross-sectional view taken along the line V—V of FIG. 1.

As clearly shown in FIGS. 3, 4 and 5, the cam-type elevating mechanism 60 comprises a selection knob 61 disposed on the right side of the upper housing 12, an operating shaft 65 extending laterally across the upper housing 12 with the right end portion thereof being fixedly connected with the selection knob 61, thereby rendering the operating shaft 65 to be rotated integrally with the selection knob 61, a click stop mechanism 62 attached to the right end portion of the operating shaft 65 disposed at a portion of the upper housing 12 which is located on an inner side of the selection knob 61, a disk cam 71 which is fixed to a portion of the operating shaft 65 which is spaced apart to the left of the central portion of the operating shaft 65 so as to enable the lifting face (outer peripheral surface) thereof to be slidably contacted with the left cam lift plate 67 of the left sliding elevator 31, and a disk cam 72 which is fixed to a portion of the operating shaft 65 which is spaced apart to the right of the central portion of the operating shaft 65 so as to enable the lifting face (outer peripheral surface) thereof to be slidably contacted with the right cam lift plate 69 of the right sliding elevator 32. The disk cams 71 and 72 are affixed to the shaft 65 so that they establish operating phases of the respective cams that are 180 degrees apart so as to enable the lifting faces (outer peripheral surface) thereof to effect vertical up or down movements of the elevators 31 and 32 that are 180 degrees out of phase.

With the cam-type elevating mechanism 60, more particularly, the left sliding elevator 31 and the right sliding elevator 32 are alternately lowered at every 180 degrees of the rotation of the selection knob 61, thereby rendering the polishing members 5A and 5B secured respectively to the polishing member-retaining members 50A and 50B to be alternately engaged with the surface 1A of the disk 1. Furthermore, it is also made possible, through the manual adjustment of the angle of the selection knob 61, to adjust the descending position of the left sliding elevator 31 and the right sliding elevator 32, i.e., the pressing force of the polishing members 5A and 5B against the surface 1A of the disk 1. FIG. 3 illustrates a state where the polishing member 5A for removing flaws is positioned at a lowest position, while the polishing member 5B for fine-polishing is positioned at a highest position.

Additionally, the upper housing 12 is also provided at a front lower portion thereof with a grip portion 15 having a latch 15a for closing or opening the upper housing 12. The latch 15a of the grip portion 15 is adapted to be bent inward or outward at the time of opening or closing of the upper housing 12, so that the latch 15a can be introduced into and engaged with an engaging hole 11a formed at the front edge portion of the upper retaining plate 11C of the lower housing 11. As shown in FIG. 4, buffer-type engaging members 79 are also provided at the back upper portion of the lower housing 11 so as to be engaged with the hinge members 14 when the upper housing 12 is fully opened.

A control panel 19 is attached to the front peripheral portion of the lower housing 11 and is provided with a start switch 16, an operation-indicating lamp 17, and a timer knob 18 for setting the polishing time. As shown in FIG. 2, a safety switch 75 is provided at the left upper edge portion of the upper retaining plate 11C of the lower housing 11, thereby enabling the power source circuit (not shown) to be switched from OFF to ON as the safety switch 75 is pushed by the bottom plate 12C when the upper housing 12 is closed. The disk cleaner 10 according to the embodiment is designed such that the motors 35A and 35B cannot be actuated even if the start switch 16 is pressed as long as the safety switch 75 is not brought into a state of ON, i.e., as long as the upper housing 12 is not completely closed.

As clearly seen from FIGS. 2 and 3, the upper retaining plate 11C and inner retaining plate 11D of the lower housing 11 are provided with plural discharge holes 13 for discharging shavings of the disk 1 or abrasive powder generated in the polishing work of the disk 1 using the polishing member 5A for removing flaws and the polishing member 5B for fine-polishing, the shavings of the disk 1 and abrasive powder being discharged into the lower housing 11. Additionally, the fan 100 is provided in the lower housing 11 so as to remove by suction shavings of the disk or abrasive powder through the discharge holes 13. Furthermore, although it is not illustrated in the drawings, a filter for entrapping the shavings of the disk 1 or abrasive powder in the air sucked by the fan 100 is provided at the back side wall of the lower housing 11.

In the operation of removing the flaws on or the dirt adhered to the surface of the disk 1 by making use of the disk cleaner 10 of the embodiment, the upper housing 12 is opened at first (a state shown in FIG. 2). Then, the disk 1 is placed on the turntable 20 with the surface to be polished being orientated upward, after which the upper housing 12 is closed. Thereafter, the selection knob 61 is turned after a determination has been made, by taking the existence or non-existence of any flaw on the surface of the disk 1 into consideration, as to what kind of polishing material (i.e., either the polishing member 5A for removing flaws or the polishing member 5B for fine-polishing) should be employed (if there is only dirt and no flaw is found, the polishing member 5B is selected). At the same time, the pressing force of the polishing member 5A or the polishing member 5B against the disk 1 is adjusted and the timer knob 18 is suitably set before pushing the start switch 16.

As a result, the polishing member 5A or the polishing member 5B that has been selected by means of the selection knob 61 is moved down and engaged with the surface 1A of the disk 1, after which, under the condition where the rotational axis Oa or Ob of the polishing member 5A or the polishing member 5B is disposed perpendicular to the surface 1A, the polishing member 5A or the polishing member 5B that has been engaged with the surface 1A of the disk 1 is caused to rotate. As a result, the disk 1 is also caused to rotate due to the frictional force between the polishing member 5A or the polishing member 5B and the surface 1A of the disk 1, thereby performing the polishing of the surface 1A of the disk 1. At the same time, the rotational driving force due to the aforementioned frictional force is transmitted via the turntable 20, the rotatable shaft 25 and the fan-driving wheel 90 to the fan 100 (via the rotatable shaft 101 of the fan 100). As a result, the fan 100 is caused to rotate through a mechanical interlocking relation with the turntable 20, thereby removing by suction the shavings of the disk or abrasive powder from the upper retaining plate 11C.

When the polishing member to be employed is required to be exchanged, i.e., the polishing member 5A is to be replaced by the polishing member 5B, the selection knob 61 is turned by an angle of 180 degrees and then the aforementioned operation is repeated. When the polishing operation of the disk 1 is finished, the upper housing 12 is opened and the polished disk 1 is taken out, after which the same procedures as mentioned above are repeated to perform the next polishing operation.

As mentioned above, since the rotational axis Oa or Ob of the polishing member 5A or the polishing member 5B is disposed perpendicular to the surface 1A of the disk 1 at the time of polishing, according to the disk cleaner 10 of the present invention, the working face of the polishing member 5A or the polishing member 5B against the surface 1A of the disk 1 becomes uniform, thereby making it possible to avoid any non-uniform abrasion of the polishing member 5A or the polishing member 5B, to ensure the flatness of the polishing surface (the bottom surface 5C) of the polishing member 5A or the polishing member 5B, and to prevent the generation of waviness in the surface of the disk 1. If the pressing condition of the polishing member 5A or the polishing member 5B against the disk 1 happens to be inappropriate, thereby preventing the disk 1 from being smoothly rotated, the surface 1A of the disk 1 may be damaged by the polishing member 5A or the polishing member 5B. However, if such a condition occurs, the rotation detecting signal can be transmitted from the rotation detector 80, thereby making it possible to control the rotation of the polishing member 5A or the polishing member 5B through a control circuit (not shown).

Inasmuch as the disk 1 is caused to rotate by a frictional force between the polishing member 5A or the polishing member 5B and the surface 1A of the disk 1, it is possible to obtain a more beautiful finish as compared with the case where the disk 1 (or a turntable 20 on which the disk 1 is mounted) is forcibly rotated by means of a motor. Additionally, since any excessive force is not imposed on the disk 1, the disk 1 can be prevented from being damaged by the polishing member 5A or the polishing member 5B. Further, since the polishing member 5A or the polishing member 5B are tubular in configuration, it is possible to reduce a force to rotate the disk 1 in the direction which is reverse to a predetermined rotational direction of the disk 1 to be effected by a frictional force between the disk 1 and the polishing member 5A or the polishing member 5B.

Additionally, since a motor is not required for rotating the disk 1, it is possible not only to prevent any temperature increase of the disk 1 due to the heat generated by the motor but also to make the polishing apparatus more compact and to reduce the cost for the polishing apparatus.

Also, since the fan 100 for removing the shavings of the disk 1 or abrasive powder is caused to rotate through a mechanical driving coupling to the turntable 20 mounting the disk 1, thereby to impose a predetermined load on the disk 1 in a direction to suppress the rotation of the disk 1 being effected through a frictional force between the polishing member 5A or the polishing member 5B and the surface 1A of the disk 1, it is possible to easily obtain a predetermined frictional force between the surface 1A of the disk 1 and the polishing member 5A or the polishing member 5B, there by enabling the surface of the disk 1 to be more effectively polished.

The two polishing member-retaining members 50A and 50B are selectively moved toward and away from the disk 1 by means of the cam-type elevating mechanism 60, thereby allowing the polishing members 5A and 5B held respectively by the polishing member-retaining members 50A and 50B to be separately and selectively engaged with the surface 1A of the disk 1. Therefore, it is only required to select either one of the polishing members 5A and 5B in conformity with the situation where the removal of flaws or the removal of dirt is desired. The replacement of one polishing member by another polishing member is not required in the present invention, thus facilitating the operation and enhancing the usefulness of the disk cleaner.

Since the pressing force of the polishing members 5A and 5B against the surface 1A of the disk 1 is made adjustable by means of the cam-type elevating mechanism 60, it is possible to impart to the polishing members 5A and 5B predetermined pressing forces, thus enabling the polishing members 5A and 5B to properly remove the flaws and dirt, even if the polishing members 5A and 5B are gradually abraded and deformed due to the use thereof for polishing operations.

Since the polishing members 5A and 5B are annular in configuration with the bottom surfaces 5C thereof being adapted to be engaged with the surface 1A of the disk 1, every portion of the polishing members 5A and 5B can easily be caused to engage the disk 1 with a uniform force, thereby making it possible to more uniformly polish the surface 1A of the disk 1.

Since the rotational diameter Ds of the polishing member 5A as well as the rotational diameter Dt of the polishing member 5B are made larger than the width Ls in the radial direction of the recording region 1b to be polished of the surface (to be polished) 1A of the disk 1, it is possible, without requiring the shifting of the polishing members 5A and 5B and/or the disk 1 in the radial direction of the disk 1, to polish the entire region to be polished of the surface 1A of the disk 1, thus making it possible to simplify the structure and the mechanisms of the disk cleaner.

Further, since the polishing members 5A and 5B are always urged to move toward the disk 1 by means of the coil springs 52, the pressing force of the polishing members 5A and 5B at the contacting bottom surface 5C thereof with the surface 1A of the disk 1 can be made more uniform, thus making it possible to more uniformly polish the surface 1A of the disk 1.

While in the foregoing one embodiment of the present invention has been explained in detail for the purpose of illustration, it will be understood that the construction of the device can be varied without departing from the spirit and scope of the invention as claimed in the following claims.

For example, although the disk cleaner 10 in the above embodiments is directed to polish one surface of a disk of about five inches in diameter, such as a CD, it will be apparent to those skilled in the art to apply the disk cleaner 10 to other kinds of disks, differing in size such as a laser disk, or to a disk whose both surfaces are required to be polished.

As explained above, it is possible with the disk cleaner of the present invention to prevent the generation of waviness on the surface of the disk and to suitably remove any flaws on or dirt that has been adhered to the surface of the disk. Furthermore, since the disk is caused to rotate by a frictional force between the polishing member and the surface of the disk, it is possible to obtain a more beautiful finish as compared with the case where the disk (or a turntable on which the disk is mounted) is forcibly rotated by means of motor. Additionally, since any excessive force is not imposed on the disk, the disk can be prevented from being damaged by the polishing member.

What is claimed is:

1. A disk cleaner, comprising
    a rotatable turntable adapted to receive a disk having a surface to be cleaned and to support the disk for rotation therewith,
    a rotatable polishing member supported for rotation about an axis that is perpendicular to the surface of the disk and for pressure engagement with the surface of the disk, and
    a drive for rotating the polishing member, and wherein the turntable is arranged such that when the polishing member is in pressure engagement with the disk and is driven in rotation the turntable and disc are caused to rotate in one direction solely due to a torque exerted on the turntable and disk produced by a frictional force acting between the polishing member and the surface of the disk.

2. The disk cleaner according to claim 1, wherein the polishing member is disposed such that the axis of rotation of the polishing member is spaced apart by a predetermined distance from a rotational axis of the disk in the radial direction of the disk, whereby only part of the polishing member engages the surface of the disk.

3. The disk cleaner according to claim 1, wherein the polishing member has an annular distal end surface that is adapted to engage the surface of the disk.

4. The disk cleaner according to claim 1, and further comprising a device arranged to apply a load to the disk in a direction to impede the rotation of the disk in said one direction.

5. The disk cleaner according to claim 4, wherein the device arranged to apply a load to the disk includes a fan for removing by suction shavings of the disk or abrasive powder, the fan being arranged to be driven by being coupled to the turntable.

6. The disk cleaner according to claim 1, wherein the polishing member is movable in a direction perpendicular to the surface of the disk.

7. The disk cleaner according to claim 1, wherein a pressing force of the polishing member against the surface of the disk is adjustable.

8. The disk cleaner according to claim 1, wherein the polishing member has a diameter that is larger than a width in the radial direction of a surface region of the disk to be polished.

9. A disk cleaner, comprising
   a rotatable turntable adapted to receive a disk having a surface to be cleaned and to support the disk for rotation therewith,
   a first rotatable polishing member supported for rotation about an axis that is perpendicular to the surface of the disk and for pressure engagement with the surface of the disk,
   a first drive for rotating the first polishing member,
   a second rotatable polishing member supported for rotation about an axis that is perpendicular to the surface of the disk and for pressure engagement with the surface of the disk, and
   a second drive for rotating the second polishing member, and wherein
      the turntable is arranged such that when either one of the first or the second polishing members is in pressure engagement with the disk and is driven in rotation the turntable and disc are caused to rotate in one direction solely due to a torque exerted on the turntable and disk produced by a frictional force acting between said one polishing member and the surface of the disk.

10. The disk cleaner according to claim 9, wherein the first polishing member is disposed such that the axis of rotation of the first polishing member is spaced apart by a predetermined distance from a rotational axis of the disk in the radial direction of the disk, whereby only part of the first polishing member engages the surface of the disk, and wherein the second polishing member is disposed such that the axis of rotation of the second polishing member is spaced apart by a predetermined distance from the rotational axis of the disk in the radial direction of the disk and is spaced apart from the axis of rotation of the first polishing member, whereby only part of the second polishing member engages the surface of the disk.

11. The disk cleaner according to claim 9, wherein axis of rotation of the first polishing member, the axis of rotation of the second polishing member, and the rotational axis of the disk lie in a common plane.

12. The disk cleaner according to claim 9, and further comprising apparatus arranged to selectively move the first polishing member toward and away from engagement with the surface of the disk and apparatus arranged to selectively move the second polishing member toward and away from engagement with the surface of the disk.

13. The disk cleaner according to claim 9, and further comprising apparatus arranged to selectively move the first polishing member into engagement with the surface of the disk and simultaneously move the second polishing member out of engagement with the surface of the disk and to selectively move the second polishing member into engagement with the surface of the disk and simultaneously move the first polishing member out of engagement with the surface of the disk.

14. The disk cleaner according to claim 9, wherein the first polishing member is annular in configuration and a distal end surface thereof is adapted to engage the surface of the disk and the second polishing member is annular in configuration and a distal end surface thereof is adapted to engage the surface of the disk.

15. The disk cleaner according to claim 9, and further comprising a device arranged to apply a load to the disk in a direction to impede the rotation of the disk in said one direction.

16. The disk cleaner according to claim 15, wherein the device arranged to apply a load to the disk includes a fan for removing by suction shavings of the disk or abrasive powder and the fan is driven by being coupled to the turntable, thereby to impose the load on the disk.

17. The disk cleaner according to claim 9, and further comprising apparatus arranged to adjust a pressing force of the first polishing member against the surface of the disk and apparatus arranged to adjust a pressing force of the second polishing member against the surface of the disk.

18. The disk cleaner according to claim 9, wherein the first polishing member has a diameter that is larger than a width in the radial direction of a surface region of the disk to be polished and the second polishing member has a diameter that is larger than a width in the radial direction of a surface region of the disk to be polished.

* * * * *